Patented May 22, 1945

2,376,734

UNITED STATES PATENT OFFICE 2,376,734

MANUFACTURE OF VINYLAROMATICS

Charles L. Thomas, Chicago, Ill., assignor to Universal Oil Products Company, Chicago, Ill., a corporation of Delaware No Drawing. Application February 11, 1942,
Serial No. 430,494

12 Claims. (Cl. 260—669)

This invention relates particularly to a process for the production of vinylaromatic compounds by the interaction of aromatic hydrocarbons and acetylenes.

It is more specifically concerned with the manufacture of styrene by interacting benzene and acetylene in contact with special catalysts. The invention may also be used to produce arylbutadienes by interacting aromatic hydrocarbons and vinylacetylenes.

The vinylaromatics, of which styrene is the lowest molecular weight member, at present are of great industrial importance, in view of their ability to undergo polymerization to form resinous materials and their ability to undergo copolymerization with lower molecular weight conjugated dienes, such as butadiene and isoprene, to form rubber substitutes. Present sources of styrene include the small production encountered in connection with the coal tar industry, the relatively small amounts producible in the high temperature pyrolysis of hydrocarbon oil fractions, and those produced by the thermal or thermal-catalytic dehydrogenation of ethyl-benzene. The present process is an improvement over previously used multi-stage processes for the production of styrene in that it involves a one-step catalyzed operation.

In one specific embodiment, the present invention comprises a process for the manufacture of styrene, which consists in contacting mixtures of benzene and acetylene with catalysts comprising as their essential constituents cuprous salts and salts of ammonium, potassium and/or magnesium.

I have determined that good yields of styrene are producible by interacting benzene and acetylene in the presence of catalysts of the above type, which are exemplified by mixtures of cuprous chloride, ammonium chloride and magnesium chloride. These catalyst mixtures may be used in solid granular form or as liquids, depending upon the proportioning of the different salts included in the categories mentioned and the presence of various amounts of water. Thus, mixtures of cuprous chloride and ammonium chloride can be employed in the dry state as granules, or alternatively as solutions of cuprous chloride and ammonium chloride with suitable modifications in the method of operating. Broadly speaking, the composite catalysts may consist of from 0 to about 45 parts of water, from 40 to 60 parts of a cuprous salt, such as, for example, cuprous chloride, and 20 to 40 parts of other salts, such as ammonium chloride, potassium chloride or magnesium chloride, singly or in admixture. The dry granules may be made by mixing the powdered, individual ingredients and pelleting if desired, or solutions of the salts in suitable proportions may be absorbed onto carriers, such as activated alumina, pumice, activated carbons, and other absorbent supports, followed by heating to drive off water and leave the salts on the surfaces and in the pores of the carrying material.

The interaction of benzene and acetylene commonly gives as its principal product diphenyl ethane, according to the following equation:

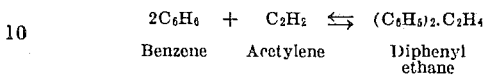

When using the preferred types of catalysts under the conditions of the present invention, this reaction may be considered to be arrested at an intermediate stage corresponding to the following equation:

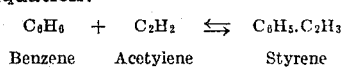

The above equations are, in general, typical of the reactions of hydrocarbons of the aromatic and the acetylene series, although in order to obtain optimum yields of particular vinylaromatics, conditions of operation with respect to catalyst compositions and conditions of time, temperature and pressure, proportioning of the reactants, etc., will require modification in different instances. Temperatures not exceeding 100° centigrade are preferably employed with aqueous catalysts, with the solid catalysts temperatures up to 250–300° centigrade may be used and relatively large molecular excesses of benzene or other aromatics over the acetylenes are preferred.

In the actual operation of the process, several alternative modes are available. In simple batch operation, the aromatic, such as benzene, may be mixed with a prepared catalyst composite in a reaction vessel, and after heating to an optimum temperature, acetylene may be gradually introduced until the desired reactions have taken place. In batch operation involving the use of catalysts containing water, pressure vessels should be employed to prevent loss of water and too extensive changes in catalyst composition. When substantially dry, composited salts are employed, it may not be necessary to utilize vessels capable of withstanding high pressures. In batch operations employing liquid catalyst composites, best results will be obtained if the catalyst solution and the aromatics, such as benzene, are intimately mixed to a more or less emulsified condition before the acetylene is added.

Continuous operations may be conducted by the use of several different procedures. If a solution of the preferred catalytic salts is employed, it may be intimately mixed with an aromatic hydrocarbon, such as benzene, and passed through a reactor maintained at a fixed temperature, with acetylene being introduced along the line of flow through the reactor, which may be a continuous tubular element. In a tubular reactor, conditions of turbulent flow should preferably be maintained in order to increase the intimacy of contact. Following the reactor, the reaction products may be passed through a separating zone where the emulsion is allowed to break and the catalytic material is separated from hydrocarbon reaction products. Any unreacted hydrocarbons capable of undergoing further reaction may be recycled after proper proportioning. The separated catalyst may be restored to its original composition by the addition of water lost in the reaction and separating zones or may receive additions of any desired salts to bring it back to its original composition.

Continuous operations may also be effected by passing the vapors of benzene and acetylene through granular composite catalysts, constituting fillers in reaction zones, at temperatures, pressures and rates consistent with the production of optimum yields of the desired product. In this mode of operation, relatively inert gases, such as hydrogen, nitrogen or steam may be added to the hydrocarbon stream as a means of controlling the time of reaction, and in some instances preventing the separation of high molecular weight condensation products on the surfaces of the granular catalytic materials. After such an operation, the products may be fractionated by any suitable method for recovering the styrene or other vinylaromatic products and permitting the recycling of catalysts and unreacted hydrocarbons.

The following example is given on the type of results obtainable in the normal operation of the process, although it is not intended to correspondingly limit the invention's proper scope.

An equimolecular mixture of acetylene and benzene is passed in vapor form at 100° C., and at atmospheric pressure, over a composite catalyst consisting of 30 parts by weight of cuprous chloride, 10 parts by weight of ammonium chloride and 3 parts by weight of magnesium chloride. The yield of styrene obtained in a single pass is 25 percent of the theoretical and by recycling of unreacted hydrocarbons this yield is increased to 45 percent.

I claim as my invention:

1. A process for the manufacture of vinyl-aromatic hydrocarbons which comprises subjecting a proportioned mixture of aromatic and acetylenic hydrocarbons to reaction in the presence of a catalyst comprising a cuprous salt.

2. A process for the manufacture of vinyl-aromatic hydrocarbons which comprises subjecting a proportioned mixture of aromatic and acetylenic hydrocarbons to reaction in the presence of a catalyst comprising a cuprous chloride and at least one compound selected from the group consisting of ammonium chloride, potassium chloride and magnesium chloride.

3. A process for the manufacture of vinyl-aromatic hydrocarbons which comprises subjecting a proportioned mixture of aromatic and acetylenic hydrocarbons at a temperature not exceeding 300° C. to reaction in the presence of a catalyst comprising a cuprous salt.

4. A process for the manufacture of vinyl-aromatic hydrocarbons which comprises subjecting a proportioned mixture of aromatic and acetylenic hydrocarbons at a temperature not exceeding 300° C. to reaction in the presence of a catalyst comprising a cuprous chloride and at least one compound selected from the group consisting of ammonium chloride, potassium chloride and magnesium chloride.

5. A process for the manufacture of styrene which comprises subjecting a mixture of benzene and acetylene containing a molecular excess of benzene to reaction in the presence of a solution comprising 25 to 45 parts by weight of water, 40 to 60 parts by weight of cuprous chloride and 20 to 40 parts by weight of at least one salt selected from the group consisting of ammonium chloride, potassium chloride and magnesium chloride.

6. A process for the manufacture of styrene which comprises subjecting a mixture of benzene and acetylene containing a molecular excess of benzene at a temperature not exceeding 100° C. to reaction in the presence of a solution comprising 25 to 45 parts by weight of water, 40 to 60 parts by weight of cuprous chloride and 20 to 40 parts by weight of at least one salt selected from the group consisting of ammonium chloride, potassium chloride and magnesium chloride.

7. A process for the manufacture of styrene which comprises subjecting a mixture of benzene and acetylene in which the benzene is in molecular excess to reaction in the presence of a composite catalyst comprising cuprous chloride and at least one salt selected from the group consisting of ammonium chloride, potassium chloride and magnesium chloride.

8. A process for the manufacture of styrene which comprises subjecting a mixture of benzene and acetylene in which the benzene is in molecular excess to reaction in the presence of a composite catalyst comprising cuprous chloride and ammonium chloride.

9. A process for the manufacture of styrene which comprises subjecting a mixture of benzene and acetylene in which the benzene is in molecular excess to reaction in the presence of a composite catalyst comprising an aqueous solution of cuprous chloride and ammonium chloride.

10. A process for the manufacture of styrene which comprises subjecting a mixture of benzene and acetylene in which the benzene is in molecular excess at a temperature not exceeding 300° C. to reaction in the presence of a composite catalyst comprising cuprous chloride and at least one salt selected from the group consisting of ammonium chloride, potassium chloride and magnesium chloride.

11. A process for the manufacture of styrene which comprises passing the vapors of benzene at an alkylating temperature through a reactor containing granular material comprising cuprous chloride and at least one salt selected from the group consisting of ammonium chloride, potassium chloride and magnesium chloride and introducing acetylene at multiple points along the line of flow in the reactor.

12. A process for the manufacture of styrene which comprises passing the vapors of benzene at an alkylating temperature not exceeding 300° C. through a reactor containing granular material comprising cuprous chloride and at least one salt selected from the group consisting of ammonium chloride, potassium chloride and magnesium chloride and introducing acetylene at multiple points along the line of flow in the reactor.

CHARLES L. THOMAS.